United States Patent
Chechenev et al.

(10) Patent No.: US 11,594,933 B2
(45) Date of Patent: Feb. 28, 2023

(54) STATOR FOR ELECTRIC MOTORS HAVING COIL WOUND CARRIERS MOUNTED THEREON

(71) Applicant: ETEL S.A., Môtiers (CH)

(72) Inventors: Dmitry Chechenev, Neuchâtel (CH); Minh-Tâm Le, Couvet (CH); Johann Pourchet, La Chaux de Gilley (FR)

(73) Assignee: ETEL S.A., Môtiers (CH)

( * ) Notice: Subject to any disclaimer, the term of this patent is extended or adjusted under 35 U.S.C. 154(b) by 207 days.

(21) Appl. No.: 17/113,264

(22) Filed: Dec. 7, 2020

(65) Prior Publication Data
US 2021/0184534 A1 Jun. 17, 2021

(30) Foreign Application Priority Data
Dec. 16, 2019 (EP) .................................. 19216436

(51) Int. Cl.
*H02K 3/52* (2006.01)
*H02K 1/14* (2006.01)
*H02K 15/02* (2006.01)

(52) U.S. Cl.
CPC ............. *H02K 3/522* (2013.01); *H02K 1/146* (2013.01); *H02K 15/022* (2013.01)

(58) Field of Classification Search
CPC ........ H02K 1/148; H02K 3/325; H02K 3/522; H02K 1/185; H02K 15/022; H02K 3/345; H02K 1/146; Y10T 29/49009
See application file for complete search history.

(56) References Cited

U.S. PATENT DOCUMENTS

| | | | |
|---|---|---|---|
| 8,008,832 B2 * | 8/2011 | Rhode | H02K 1/148 |
| | | | 310/216.058 |
| 9,455,606 B2 | 9/2016 | Ewert et al. | |
| 9,653,957 B2 * | 5/2017 | Senoo | H02K 3/522 |
| 9,824,806 B2 | 11/2017 | Nonaka et al. | |
| 9,948,166 B2 * | 4/2018 | Kino | B29C 45/14467 |
| 10,559,993 B2 * | 2/2020 | Senoo | H02K 1/146 |
| 2015/0239334 A1 | 8/2015 | El Baraka et al. | |
| 2016/0118853 A1 | 4/2016 | Nishikawa | |
| 2020/0274405 A1 | 8/2020 | Csoti et al. | |

FOREIGN PATENT DOCUMENTS

DE 10 2017 216 084 A1 3/2019
EP 2 889 988 A1 7/2015

* cited by examiner

Primary Examiner — Quyen P Leung
Assistant Examiner — Leda T Pham
(74) Attorney, Agent, or Firm — Carter, DeLuca & Farrell LLP

(57) ABSTRACT

A stator for electric motors, includes a core having an upper and a lower portion and having teeth forming slots therebetween, first and second coil locking layers fixedly mounted on respective upper and lower portions of the core, and a plurality of preformed coil assemblies mounted on respective teeth of the core. Each coil wound carrier includes a winding section having an elongated opening configured to be adjusted around the corresponding tooth, and a first and a second winding carrier connected to opposite ends of the winding section. The first and second winding carriers include a projecting mating part, and the first and second coil locking rings include mating openings of complementary shape inside which are fitted the projecting mating part of respective first and second winding carriers of one of the preformed coil assemblies.

20 Claims, 4 Drawing Sheets

STATOR FOR ELECTRIC MOTORS HAVING COIL WOUND CARRIERS MOUNTED THEREON

CROSS-REFERENCE TO RELATED APPLICATIONS

The present application claims priority to Application No. 19216436.6, filed in the European Patent Office on Dec. 16, 2019, which is expressly incorporated herein in its entirety by reference thereto.

FIELD OF THE INVENTION

The present invention relates to a stator for electric motors, including coil wound carriers mounted thereon. A plurality of preformed coil assemblies may be mounted on corresponding teeth of the stator. The present invention also relates to a rotary electric motor including such stator as well as a method for assembling a stator of a rotary electric motor.

BACKGROUND INFORMATION

During the manufacturing process of stators for rotary electric motors, the various components of the stator, such as coils, coil support, cables, and sensors, if needed, are assembled and all electrical connections are performed. The assembly is then potted in a specially adapted leak-tight enclosure, a so-called potting mold, by injection of synthetic resin, such as epoxy, at ambient pressure or under vacuum.

Potting is an important operation as it protects cabling, guarantees a minimum distance between conductive parts and humans/machines in order to comply with CE standards, improves thermal dissipation performances, and solidifies and fixes together all components of the stator, particularly the coils.

In some cases, however, e.g., for motors for low ambient temperatures, such as those used in aircraft, potting cannot be used in the motor because cracks could appear after a few temperature cycles. In this instance, other solutions to fix the coils to the stator may be required.

Winding carriers may be utilized to center the coils on the teeth of the stator in order to provide electrical insulation, to guarantee minimum distances to respect CE standards, and to help with orthocyclic winding of the coils.

Other approaches for centering and securing the coils on the teeth of the stator exist. U.S. Pat. No. 9,455,606, for example, discloses a winding carrier for a coil, that is configured to be mounted on a tooth of a stator for an electrical machine. The winding carrier is made of an electrically insulating material and includes a winding section around which a coil is wound.

However, U.S. Pat. No. 9,455,606 is silent on how winding carriers are reliably secured on the stator teeth.

SUMMARY

Example embodiments of the present invention provide a stator for electric motors that is, for example, configured to address the above disadvantages.

Example embodiments of the present invention provide a stator for electric motor, in which preformed coil assemblies are reliably secured to the stator teeth.

Example embodiments of the present invention provide a stator for electric motors that may be easy to assemble and cost-effective to manufacture.

Example embodiments of the present invention provide a method for securing each preformed coil assembly on the stator teeth.

According to an example embodiment of the present invention, a stator for electric motors includes a core having an upper and a lower surface and teeth forming slots therebetween, a first and a second coil locking layer fixedly mounted on respective upper and lower surfaces of the core, and a plurality of preformed coil assemblies mounted on respective teeth of the core. Each preformed coil assembly includes a winding section having an elongated opening configured to be fitted around the corresponding tooth, and first and second winding carriers connected to respective opposite ends of the winding section. The first and second winding carriers of each of the plurality of preformed coil assemblies include a projecting mating part while the first and second coil locking rings include a corresponding plurality of mating openings of complementary shape inside which are fitted the projecting mating part of respective first and second winding carriers of one of the preformed coil assemblies.

The stator may include a first supporting layer mounted between the upper surface of the core and the first coil locking layer, and a second supporting layer mounted between the lower surface of the core and the second coil locking layer.

The first and second winding carriers may each include a winding portion having a contacting surface resting against a corresponding surface of respective first and second supporting layers.

The first and second winding carriers may each include projecting walls extending on both sides of the contacting surface.

The projecting mating part of the first and second winding carriers may include a contacting surface resting on a lateral portion of respectively the first and second supporting layers.

The projecting mating part of each of the first and second winding carriers may be arranged as a T-shaped mating part fitted inside a corresponding T-shaped opening of a plurality of T-shaped openings arranged on the first and second coil locking layers.

The core may be arranged as a cylindrical core having teeth extending radially and inwardly from an inner surface of the cylindrical core. The first and second coil locking layers may be arranged as annular coil locking layers fixedly mounted on respective upper and lower annular surfaces of the core.

According to an example embodiment of the present invention, an electric rotary motor includes a stator as described above and a rotor rotatably mounted on the stator.

According to an example embodiment of the present invention, a method for assembling a stator of a rotary electric motor, includes: providing a cylindrical core having an upper and a lower annular surface and having teeth extending radially and inwardly from an inner surface of the cylindrical core, and forming slots therebetween; fixedly mounting a first supporting ring on the upper surface of the core and a second supporting ring on the lower surface of the core; providing a plurality of preformed coil assemblies each including a winding section having an elongated opening, and a first and a second winding carrier connected to respective opposite ends of the winding section, the first and second winding carriers including a projecting mating part having a contacting surface; adjusting the elongated opening of the winding section of each preformed coil assembly around a corresponding tooth of the cylindrical core such that the contacting surface of the projecting mating part of the first winding carrier of each preformed coil assembly rests against the first supporting ring, while the contacting surface of the projecting mating part of the second winding carrier of each preformed coil assembly rests against the second supporting ring; and fixedly mounting a first coil locking ring against the first supporting ring and a second locking ring against the second supporting ring, the first and second coil locking rings including a corresponding plurality of openings of complementary mating shape, thereby surrounding each projecting mating part of respective first and second winding carriers of each of the preformed coil assemblies.

Further features and aspects of example embodiments of the present invention are described in more detail below with reference to the appended Figures.

BRIEF DESCRIPTION OF THE DRAWINGS

FIG. 5b is a side view of the winding carrier illustrated in FIG. 5a.

DETAILED DESCRIPTION

Figure 1:
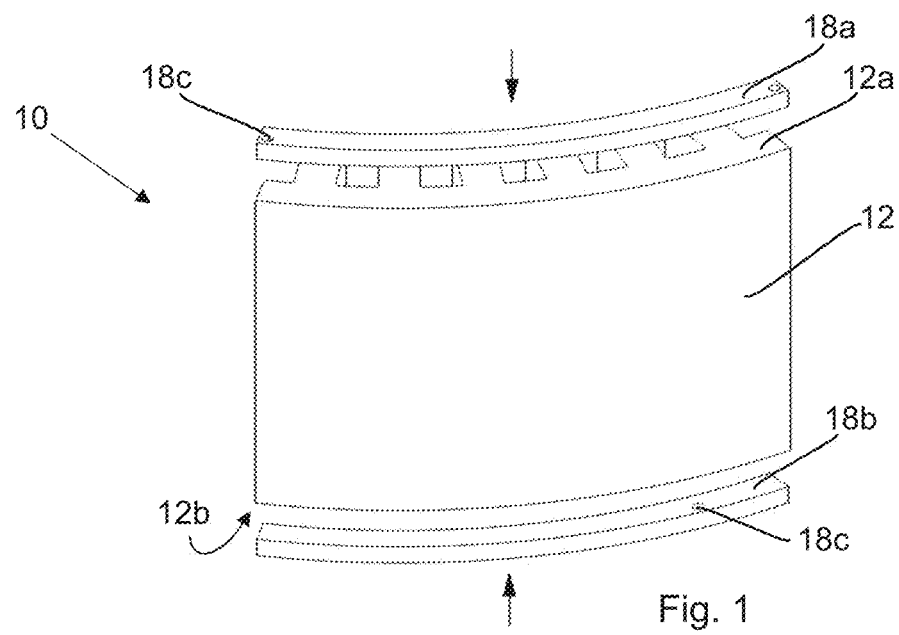
FIG. 1 is a partial perspective view of a core of a stator during an initial step of the assembly of preformed coil assemblies.
Figure 2:
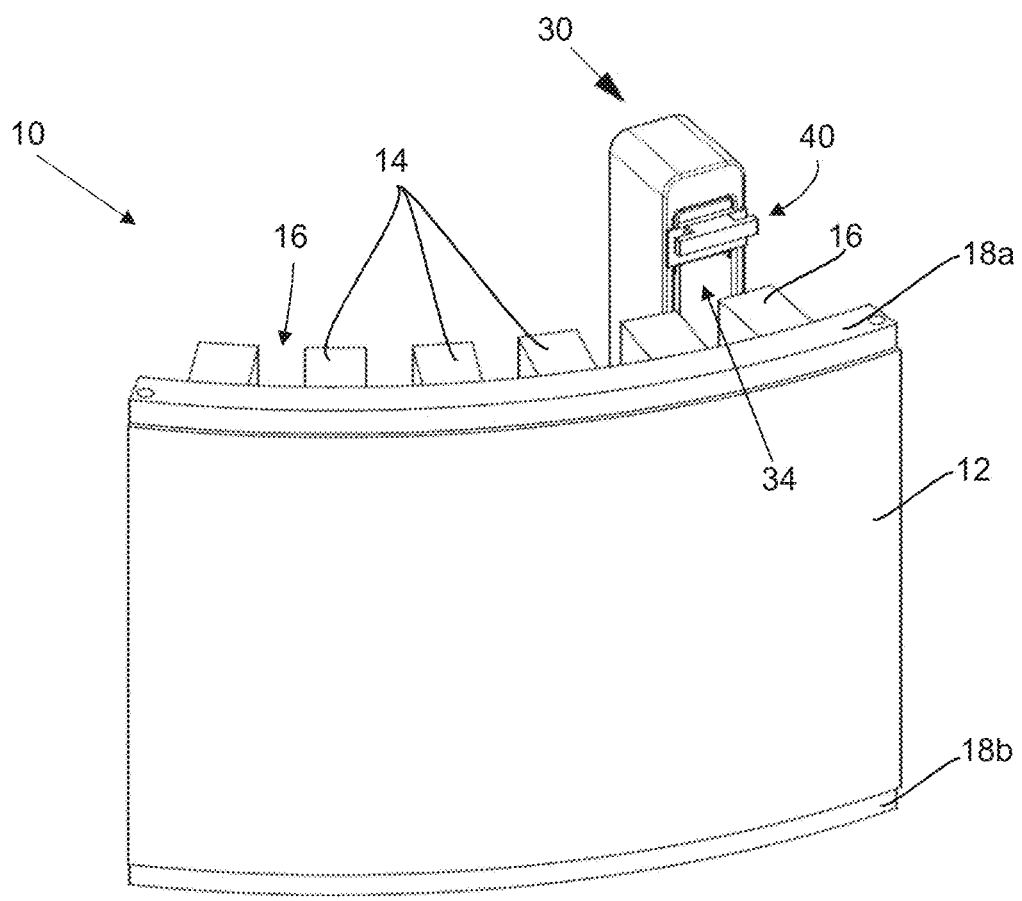
FIG. 2 is a similar view to that of FIG. 1 during a subsequent step of the assembly of the preformed coil assemblies.
Figure 3:
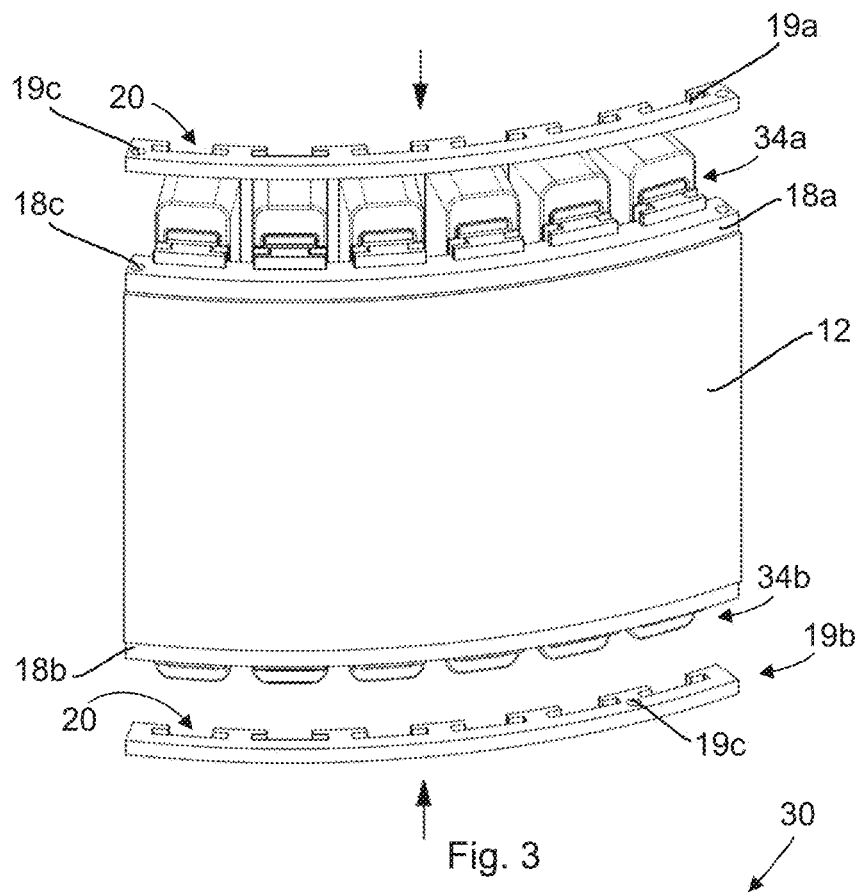
FIG. 3 is a similar view to that of FIG. 2 during a further step of the assembly of the preformed coil assemblies.
Figure 4:
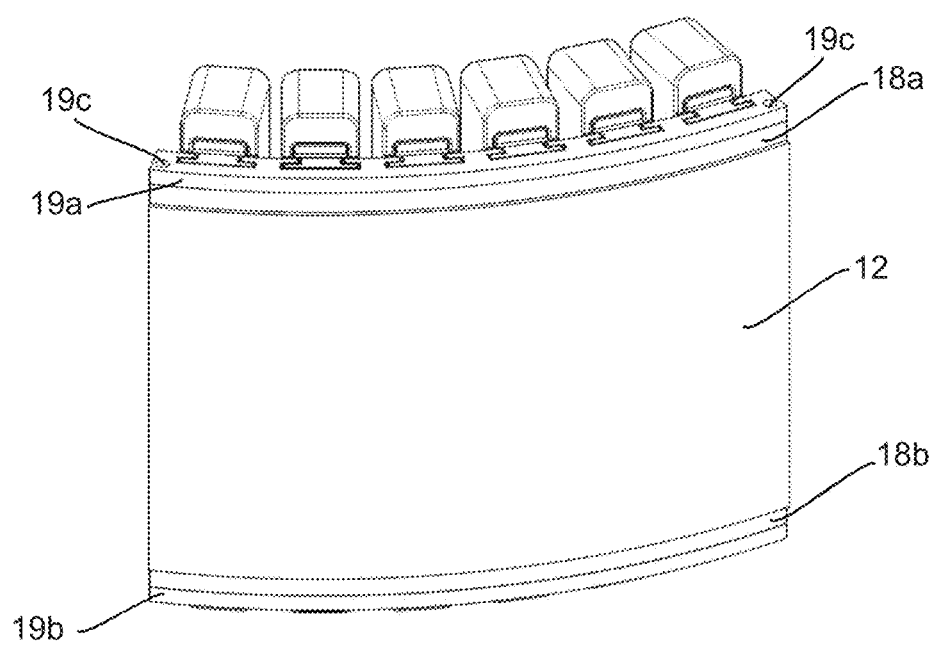
FIG. 4 is a similar view to that of FIG. 3 during a final step of the assembly of the preformed coil assemblies, whereby the preformed coil assemblies are permanently secured to the stator.

Referring to FIG. 1, an upper and a lower supporting ring 18a, 18b made of an insulating material are fixedly mounted against respective upper and lower annular surfaces 12a, 12b of a cylindrical iron core 12 made of a laminated stack and including teeth 14 extending radially and inwardly from an inner surface of the iron core 12 to form slots 16 therebetween (see also FIG. 2). The upper and lower supporting rings 18a, 18b may be affixed against their respective annular surface 12a, 12b, for example, by glue or an adhesive tape. This affixing can, however, be temporary, because the supporting rings 18a, 18b will be maintained in place by the preformed coil assemblies after insertion. The thickness of the supporting rings 18a, 18b is selected to prevent axial displacement of preformed coil assemblies 30 when they are inserted in their respective tooth 14, as illustrated in FIGS. 2 to 4.

Figure 5A:
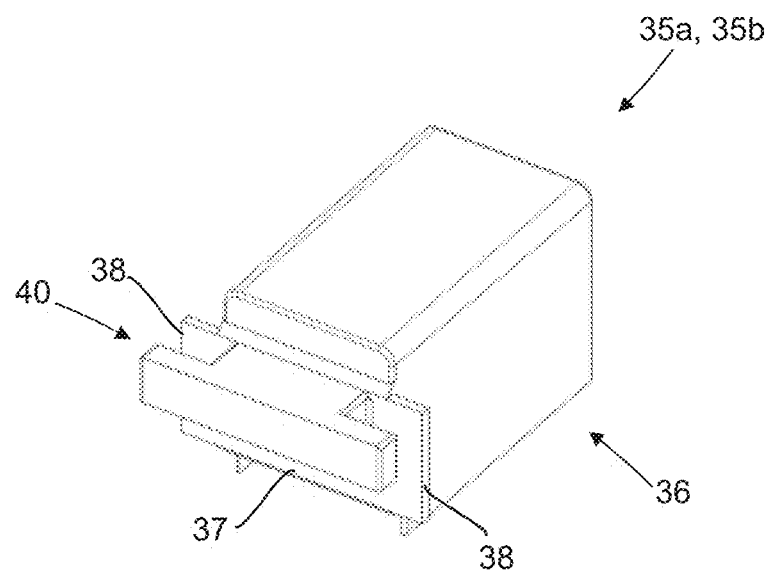
FIG. 5a is a perspective view of a winding carrier of either first or second winding carriers of a preformed coil assembly.
Figure 5B:
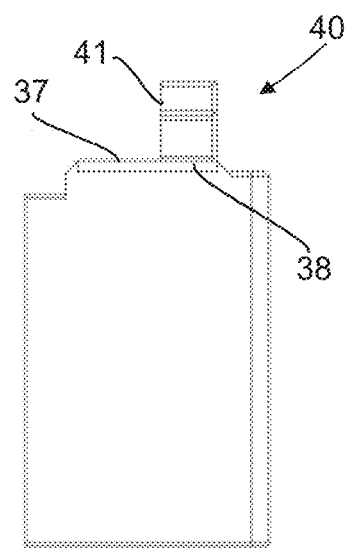
Figure 6:
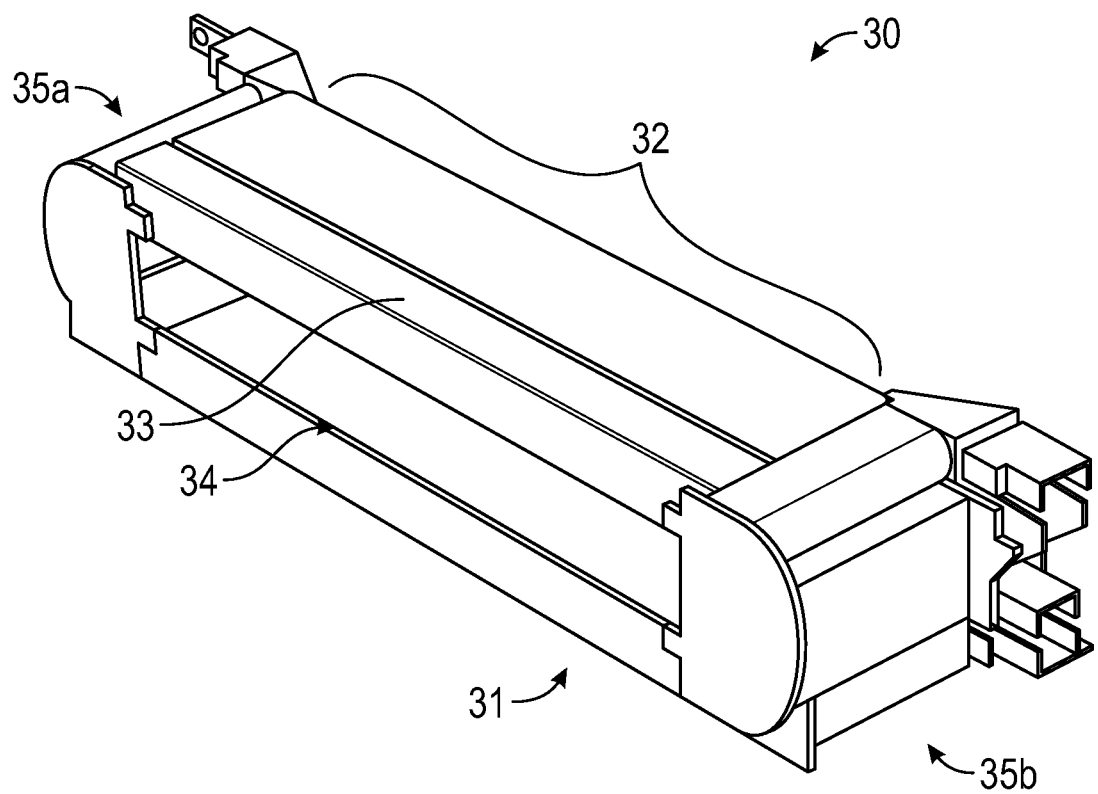
FIG. 6 illustrates a conventional preformed coil assembly.

Referring to FIG. 6, each preformed coil assembly 30 includes an elongated opening 34 lined with insulation paper 33 and a first and a second winding carriers 35a, 35b (see also FIG. 5a) mounted at the two ends of a preformed rectangular coil 31 to form a winding section 32. As illustrated in FIGS. 5a and 5b, each of the first and second winding carriers 35a, 35b includes a winding portion 36 and a projecting mating part 40 extending from one side of the winding portion 36. A contacting surface 37, adjacent the projecting mating part 40, extends across the width of each first and second winding carriers 35a, 35b of the preformed coil assembly 30. The projecting mating part may be arranged as, for example, a T-shaped mating part 40 having a contacting surface 41, as illustrated in FIG. 5b, which is adapted to rest against a surface of the upper or lower supporting ring 18a, 18b. However, the projecting mating part 40 may have different shapes, as described below.

The first and second winding carriers 35a, 35b of each preformed coil assembly 30 further include projecting walls 38 extending on both sides of the contacting surface 37 in order to provide for an orthocyclic winding of the rectangular coil 31 and to provide additional electrical insulation.

Referring to FIG. 2, the preformed coil assemblies 30 are fitted around their respective teeth 14 such that the contacting surface 41 of the T-shaped mating part 40 extends radially on the corresponding supporting ring 18a, 18b while the contacting surface 37 rests against an inner portion of the supporting ring 18a, 18b. The rectangular opening 34 may, for example, be slightly larger than the dimensions of the tooth 14 to provide mounting tolerances in the order of, e.g., 100 microns in both orthogonal directions.

Once all preformed coil assemblies 30 are mounded on their respective teeth 14, upper and lower coil locking rings 19a, 19b are affixed respectively against the upper and lower supporting rings 18a, 18b, as illustrated in FIGS. 3 and 4. Each coil locking ring 19a, 19b includes a plurality of mating through-openings 20 regularly spaced apart from each other around the ring. The mating through-openings 20 may have a corresponding T-shaped configuration to receive respective T-shaped mating part 40 of each winding carrier 35a, 35b of the preformed coil assembly 30. The mating through-opening may, however, have different shapes that are complementary to the shapes of the projecting mating part 40 of the first and second winding carriers 35a, 35b of the preformed coil assembly 30.

As illustrated, for example, in FIG. 3, each of the upper and lower supporting rings 18a, 18b and each of the upper and lower coil locking rings 19a, 19b include non-threaded through-holes 18c, 19c for their permanent affixation to the upper and lower supporting rings 18a, 18b by, e.g., self-tapping screws.

In summary, when coil carriers 30 are fitted around their respective tooth 14, the coils are locked such that: i) axial movement is prevented by the upper and lower supporting rings 18a, 18b; ii) radial movement is prevented by the upper and lower coil locking rings 19a, 19b; and iii) tangential movement is prevented by the respective radial tooth 14.

Although potting is not suitable for aircraft applications, the motor stator may undergo an impregnation process using varnish and curing to glue all parts together and prevent long-term damage, for example, due to vibration.

The stator 10 for electric motors as described herein may be readily assembled and cost-effective to produce, since expensive components are not required. For example, the supporting rings 18a, 18b and coil locking rings 19a, 19b may be cut out of a sheet of raw material, e.g., with water jet cutting. PA, LCP, or other non-conductive materials may be used. Coil locking rings 19a, 19b may be segmented to decrease the amount of wasted material.

Assembling the stator may entail the following steps. An initial step includes fixedly mounting the upper supporting ring 18a on the upper surface 12a of the core 12 and the lower supporting ring 18b on the lower surface 12b of the core by, for example, glue or an adhesive layer. A subsequent step includes adjusting the elongated opening 34 of the winding section 32 of each preformed coil assembly 30 around a corresponding tooth 14 of the cylindrical core 12 such that the contacting surface 41 of the projecting mating part 40 of the first winding carrier 35a of each preformed coil assembly 30 rests against the upper supporting ring 18a, while the contacting surface 41 of the projecting mating part 40 of the second winding carrier 35b of each preformed coil assembly 30 rests against the lower supporting ring 18b. A further step includes fixedly mounting the upper coil locking ring 19a against the upper supporting ring 18a and the lower locking ring 19b against the lower supporting ring 18b by, for example, glue or an adhesive layer. A subsequent step includes ensuring permanent affixation of the supporting and coil locking rings against the upper and lower surfaces 12a, 12b of the core 12 by, for example, self-tapping screws. The stator winding may be optionally impregnated thereafter with varnish and cure as required.

LIST OF REFERENCE NUMERALS

10 Stator
12 Cylindrical core
12a Upper annular surface
12b Lower annular surface
14 Radial teeth
16 Slots
18a, 18b Upper and lower supporting ring
18c Non-threaded holes
19a, 19b Upper and lower coil locking rings
19c Non-threaded holes
20 Mating opening
30 Preformed coil assembly
31 Preformed coil
32 Winding section
33 Insulation paper
34 Elongated opening
35a, 35b First and second winding carriers
36 Winding portion
37 Contacting surface
38 Lateral projecting wall
40 Projecting mating part
41 Contacting surface 41

What is claimed is:

1. A stator for an electric motor, comprising:
a core having an upper surface, a lower surface, and teeth forming slots therebetween;
a first coil locking layer fixedly mounted on the upper surface of the core;
a second coil locking layer fixedly mounted on the lower surface of the core; and
a plurality of preformed coil assemblies, each preformed coil assembly mounted on a respective tooth of the core, each preformed coil assembly including a winding section having an elongated opening configured to be arranged around the respective tooth and first and second winding carriers connected to respective opposite ends of the winding section;
wherein the first winding carrier and the second winding carrier include a projecting mating part and the first coil locking layer and the second coil locking layer include corresponding mating openings of complementary shape to the projecting mating part, the projecting mating parts of the first and second winding carriers being fitted inside corresponding mating openings of the first and second coil locking layer.

2. The stator according to claim 1, further comprising a first supporting layer arranged between the upper surface of the core and the first coil locking layer, and a second supporting layer arranged between the lower surface of the core and the second coil locking layer.

3. The stator according to claim 2, wherein the first winding carrier includes a winding portion having a contact surface that rests against a corresponding surface of the first supporting layer, and the second winding carrier includes a winding portion having a contact surface that rests against a corresponding surface of the second supporting layer.

4. The stator according to claim 3, wherein the first and second winding carriers include projecting walls extending on both sides of the contact surface.

5. The stator according to claim 4, wherein the projecting mating parts of the first winding carrier and the second winding carrier include a contact surface arranged on a lateral portion of a respective one of the first and second supporting layers.

6. The stator according to claim 3, wherein the projecting mating parts of the first winding carrier and the second winding carrier include a contact surface arranged on a lateral portion of a respective one of the first and second supporting layers.

7. The stator according to claim 2, wherein the first supporting layer is affixed to the upper surface of the core by glue and/or an adhesive layer, and the second supporting layer is affixed to the lower surface of the core by glue and/or an adhesive layer.

8. The stator according to claim 7, wherein the first coil locking layer is affixed to the first supporting layer by glue and/or an adhesive layer, and the second coil locking layer is affixed to the second supporting layer by glue and/or an adhesive.

9. The stator according to claim 2, wherein the first coil locking layer and the first supporting layer are screw-connected to the upper surface of the core, and the second coil locking layer and the second supporting layer are screw-connected to the lower surface of the core.

10. The stator according to claim 1, wherein the projecting mating part is arranged as a T-shaped mating part fitted inside a corresponding T-shaped opening of a plurality of T-shaped openings arranged on the first and a second coil locking layer.

11. The stator according to claim 1, wherein the projecting mating part is arranged as a T-shaped mating part, and the corresponding mating opening is arranged as a T-shaped opening, the T-shaped mating part being fitted inside a corresponding T-shaped opening.

12. The stator according to claim 1, wherein the core is arranged as a cylindrical core, the teeth of the core extending radially and inwardly from an inner surface of the cylindrical core, the upper and lower surfaces of the core being arranged as annular surfaces, the first coil locking layer and the second coil locking layer being arranged as annular coil locking layers, the first annular coil locking layer being fixedly mounted on the upper annular surface of the core, the second annular coil locking layer being fixedly mounted on the lower annular surface of the core.

13. An electric rotary motor, comprising:
a stator according to claim 12; and
a rotor rotatably mounted on the stator.

14. The stator according to claim 1, wherein the first coil locking layer is screw-connected to the upper surface of the core, and the second coil locking layer is screw-connected to the lower surface of the core.

15. A method for assembling a stator of a rotary electric motor, comprising:
fixedly mounting a first supporting ring on an upper annular surface of a cylindrical core;

fixedly mounting a second supporting ring on a lower surface of the cylindrical core;

arranging an elongated opening of a winding section of each of a plurality of preformed coil assemblies around a corresponding tooth of the cylindrical core that extends radially and inwardly from an inner surface of the cylindrical core so that a contact surface of a projecting mating part of a first winding carrier of each preformed coil assembly is arranged against the first supporting ring and so that a contact surface of a projecting mating part of a second winding carrier of each preformed coil assembly is arranged against the second supporting ring, the first winding carrier and the second winding carrier being connected to opposite ends of the winding section;

fixedly mounting a first coil locking ring against the first supporting ring, the first coil locking ring including a plurality of openings of complementary mating shape to the projecting mating part of the first winding carrier, the projecting mating part of the first winding carrier of each preformed coil assembly being arranged in a respective opening of the first coil locking ring; and fixedly mounting a second coil locking ring against the second supporting ring, the second coil locking ring including a plurality of openings of complementary mating shape to the projecting mating part of the second winding carrier, the projecting mating part of the second winding carrier of each preformed coil assembly being arranged in a respective opening of the second coil locking ring.

16. The method according to claim 15, wherein the first supporting ring is fixedly mounted on the upper annular surface of the cylindrical core by glue and/or an adhesive layer, and the second supporting ring is fixedly mounted on the lower annular surface of the cylindrical core by glue and/or an adhesive layer.

17. The method according to claim 15, wherein the first coil locking ring is fixedly mounted against the first supporting ring by glue and/or an adhesive layer, and the second coil locking ring is fixedly mounted against the second supporting ring by glue and/or an adhesive layer.

18. The method according to claim 15, further comprising driving screws through the first coil locking ring and first supporting ring into the cylindrical core, and driving screws through the second coil locking ring and second supporting ring into the cylindrical core.

19. The method according to claim 18, wherein the screws are arranged as self-tapping screws.

20. The method according to claim 15, wherein the projecting mating part is arranged as a T-shaped projecting mating part, and the opening is arranged as a T-shaped opening.

* * * * *